Patented Aug. 11, 1953

2,648,658

UNITED STATES PATENT OFFICE 2,648,658

EMULSION POLYMERIZATION OF UNSATURATED ORGANIC COMPOUNDS

Edwin J. Vandenberg, Wilmington, Del., assignor to Hercules Powder Company, Wilmington, Del., a corporation of Delaware No Drawing. Application April 12, 1947, Serial No. 741,000

20 Claims. (Cl. 260—84.1)

This invention relates to an improved process for the emulsion polymerization of unsaturated organic compounds and more particularly to an improved process of polymerizing vinyl, vinylidene, and vinylene compounds to provide synthetic rubberlike materials.

It is well known that unsaturated organic compounds, particularly those containing the vinyl group, may be advantageously polymerized in aqueous emulsion. Through use of the emulsion technique synthetic rubberlike materials have been prepared by polymerizing diolefins, halogen derivatives of diolefins, or other substituted diolefins or by interpolymerizing diolefins with other compounds containing a vinyl group such as styrene, acrylic acid esters, and acrylonitrile. Polymers such as polyvinyl halides, polyvinyl acetate, polystyrene, polymethylmethacrylate, and various other addition polymers also have been prepared by polymerization in aqueous emulsion. Soaps of fatty acids commonly have been used as emulsifying agents for polymerizations of this type.

The alkali metal salts of fatty acids have been used satisfactorily as emulsifying agents in the preparation of polymers by emulsion polymerization, but these fatty acid soaps have been somewhat disadvantageous in that relatively long polymerization times were required to obtain satisfactory yields of polymers and in that the ordinary polymerization systems using fatty acid soaps as emulsifying agents were quite sensitive to the presence of inhibitors.

Now in accordance with this invention it has been found that the alkali metal salts of fatty acids may be used more successively than heretofore as emulsifying agents in the emulsion polymerization of organic compounds containing the $CH_2=C<$ group by carrying out the polymerization in the presence of a catalyst comprising a tertiary organic hydroperoxide having more than five carbon atoms, an activator comprising a water-soluble heavy metal salt and an $\alpha$-hydroxycarbonyl compound, and an emulsifying agent comprising an alkali metal salt of a fatty acid. By the process in accordance with this invention the polymerization of vinyl, vinylidene, and vinylene compounds may be effected within shorter lengths of time than previously possible with the attainment of satisfactory yields of polymers and without inhibition occurring.

In carrying out the process in accordance with this invention the polymerization of vinyl, vinylidene, and vinylene compounds is effected in the usual manner utilizing the well-known emulsion technique. However, the polymerization is effected in the presence of an alkali metal salt of a fatty acid as the emulsifying agent and the catalyst utilized constitutes a tertiary organic hydroperoxide having more than five carbon atoms. There also is used an activator comprising a water-soluble heavy metal salt and an $\alpha$-hydroxycarbonyl compound such as a reducing sugar.

The following examples are illustrative of the preparation of polymers by emulsion polymerization and the products thereof in accordance with this invention. All parts given in the examples represent parts by weight.

Example 1

A glass polymerization vessel was charged with 5.0 parts of the sodium salt of a mixture of palmitic and stearic acids, 0.17 part of $\alpha,\alpha$-dimethylbenzyl hydroperoxide, 0.5 part of fructose, 178.2 parts of water, and 2.0 parts of an activating salt solution, each 1.0 part of activating salt solution containing 0.075 part of sodium pyrophosphate decahydrate, 0.0042 part of ferric sulfate nonahydrate, 0.00019 part of cobaltous chloride hexahydrate, and 0.92 part of distilled water. The polymerization vessel then was charged with 25.0 parts of styrene, 75.0 parts of butadiene-1,3 and 0.5 part of the mixture of primary mercaptans derived from Lorol, which is a commercial product containing primary lauryl alcohol but also some higher and lower aliphatic alcohols. The vessel was sealed, and its contents then were agitated at a temperature of 40° C. for 2.3 hours. At the end of this time the resulting emulsion was run into an open vessel containing 50 parts of a 2% aqueous suspension of phenyl-$\beta$-naphthylamine and 10 parts of a 2% aqueous hydroquinone solution, stripped of the excess butadiene and precipitated by the addition of about 400 parts of a solution containing 700 parts of sodium chloride and about 46 parts of concentrated sulfuric acid dissolved in about 2000 parts of water. The precipitated copolymer was thoroughly washed with water until free of acid, then dried to constant weight. After correcting the total yield to allow for nonpolymer solids it was found that the actual conversion of monomers to copolymer was 72%.

Example 2

A glass polymerization vessel was charged with 5.0 parts of the sodium salt of the mixture of fatty acids obtained from linseed oil, 0.51 part of $\alpha,\alpha$-dimethylbenzyl hydroperoxide, 0.5 part of fructose, 161.6 parts of water, and 20.0 parts of an activating salt solution, each 1.0 part of activating salt solution containing 0.075 part of sodium pyrophosphate decahydrate, 0.0042 part of ferric sulfate nonahydrate and 0.92 part of distilled water. The polymerization vessel then was charged with 25.0 parts of styrene, 75.0 parts of butadiene-1,3 and 0.5 part of the mercaptan mixture of Example 1. The vessel was sealed, its contents agitated at 40° C. for 7.4 hours, and the resulting emulsion worked up as in Example 1. It was found that the conversion of monomers to copolymer was 72%.

*Example 3*

The procedure of Example 2 was duplicated with the exception that 5.0 parts of the sodium salt of the mixture of fatty acids obtained from soybean oil was used in place of the sodium salt of the linseed oil fatty acids of Example 1. At the end of 8.3 hours it was found that the conversion of monomers to copolymer was 72%.

*Example 4*

The procedure of Example 2 was duplicated with the exception that 0.1 part of ascorbic acid was substituted for the 0.5 part of fructose. The polymerization was carried out for 16.4 hours and at the end of this time it was found that the conversion of monomers to copolymer was 53%.

*Example 5*

Following the procedure of Example 2 the polymerization was carried out using 5.0 parts of the sodium salt of linoleic acid in place of the sodium salt of the linseed oil fatty acids as emulsifying agent. The polymerization was carried out at 40° C. for 2.2 hours and at the end of this time it was found that the conversion of monomers to copolymer was 72%.

*Exampe 6*

A glass polymerization vessel was charged with 5.0 parts of the sodium salt of a mixture of palmitic and stearic acids, 0.17 part of α,α-dimethylbenzyl hydroperoxide, 0.5 part of acetylacetone, 161.6 parts of water, 20.0 parts of the activating salt solution of Example 2, 25.0 parts of styrene, 75.0 parts of butadiene-1,3, and 0.5 part of a tertiary mercaptan blend composed of $C_{12}$, $C_{14}$ and $C_{16}$ tertiary mercaptans in the ratio of 3:1:1. The vessel was sealed and its contents then were agitated at a temperature of 40° C. for 4.0 hours. At the end of this time the resulting emulsion was worked up as in Example 1 and it was found that the conversion of monomers to copolymer was 69%.

*Example 7*

The procedure of Example 2 was duplicated with the exception that there was substituted for the α,α-dimethylbenzyl hydroperoxide 0.71 part (7.6% active oxygen) of a commercial hydroperoxide mixture containing 1,2 - dimethylcyclopentyl, 1,3 - dimethylcyclopentyl, methylcyclohexyl, dimethylcyclohexyl and some heptyl and octyl hydroperoxides, 80% of the hydroperoxides of this mixture being naphthenic, 80% of the hydroperoxy groups being attached to tertiary carbon atoms, and the ratio of $C_7$ to $C_8$ components being 2:1. At the end of 7.6 hours it was found that the conversion of monomers to copolymer was 72%.

The process in accordance with this invention is carried out in the presence of an emulsifying agent which is an alkali metal salt of a fatty acid. The fatty acids may be either saturated or unsaturated and exemplary of the acids are stearic, palmitic, lauric, oleic, margaric, linoleic, linolenic, and myristic acids. Any fatty acid may be used in accordance with this invention but it is preferable to use those fatty acids which exist in combination with glycerol as glycerol esters in natural fats and oils. Thees fatty acids are long-chain fatty acids, generally having between 16 and 18 carbon atoms in the molecule. The acids themselves may be used in the form of their alkali metal salts as the emulsifying agents in accordance with this invention although, as shown by some of the examples, there may be used a mixture of acids obtained by the hydrolysis of natural fats and oils such as linseed, soybean, cottonseed, coconut, palm, China-wood, corn, perilla, and castor oils and fish oils such as menhaden oil. From the standpoint of economy and convenience, it is more advantageous to use the mixture of fatty acids obtained by the hydrolysis of such fats and oils. The alkali metal salts are prepared by neutralization of the fatty acids with an alkali metal compound basic in characteristics, such as the hydroxides and carbonates of sodium and potassium. The concentration of the emulsifying agent, namely, the alkali metal salt of the fatty acid, during the polymerization may be from about 1 to about 5%, preferably from about 2 to about 3% in the aqueous phase. Based on the amount of monomers present, the amount of emulsifying agent may be from about 1.5 to about 10%, preferably from about 4 to about 6%.

The catalysts which are operable in the polymerization process of this invention have been illustrated in the examples by α,α-dimethylbenzyl hydroperoxide and the commercial hydroperoxide mixture containing 1,2-dimethylcyclopentyl, 1,3-dimethylcyclopentyl, methylcyclohexyl, dimethylcyclohexyl, and some heptyl and octyl hydroperoxides. Other operable hydroperoxides are α,α-dimethyl-3,5-diisopropylbenzyl hydroperoxide and triethylmethyl hydroperoxide (3-ethylamyl 3-hydroperoxide). In general, the process in accordance with this invention may be carried out in the presence of any tertiary hydroperoxide having more than 5 carbon atoms, but preferably between 6 and 30 carbon atoms, and most desirably between 7 and 15 carbon atoms. The tertiary hydroperoxides may be given the general formula of ROOH, in which R may be any hydrocarbon radical containing a tertiary carbon atom to which is attached the hydroperoxy (—OOH) group. R may be, for example, a saturated aliphatic hydrocarbon radical containing a tertiary carbon atom such as the triethylmethyl radical in triethylmethyl hydroperoxide, a cycloaliphatic hydrocarbon radical such as the 1,3-dimethylcyclopentyl radical in 1,3-dimethylcyclopentyl 1-hydroperoxide, or an aralkyl radical such as the α,α-dimethylbenzyl radical in α,α-dimethylbenzyl hydroperoxide. From the standpoint of commercial availability those hydroperoxides similar to α,α-dimethylbenzyl hydroperoxide are particularly useful. The latter is illustrative of the general class of hydroperoxides known as α,α-dialkylarylmethyl, or aryl(dialkyl)methyl, hydroperoxides.

The α,α-dialkylarylmethyl hydroperoxides may be prepared by the oxidation of alkyl-substituted aromatic organic compounds having the structural formula

in which $R_1$ and $R_2$ represent alkyl groups and Ar represents a substituent selected from the group consisting of aryl and alkaryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° and about 95° C. in the presence of an aqueous alkali. The concentration of the aqueous alkali may be between about 1 and about 35% although it is preferable to use concentrations of about 2 to about 8%. Vigorous agitation is desirable during the oxidation reaction.

As illustrative of the alkyl-substituted aromatic organic compounds which may be oxidized, p-cymene, cumene, diisopropylbenzene, and sec-butylbenzene may be mentioned. These compounds lead to $\alpha,\alpha$-dimethyl-p-methylbenzyl, $\alpha,\alpha$-dimethylbenzyl, $\alpha,\alpha$-dimethyl-p-isopropylbenzyl, and $\alpha,\alpha$-ethylmethylbenzyl hydroperoxides, respectively. The aryl and alkaryl groups need not be derived from benzene, as is the case in the afore-mentioned compounds, for compounds containing aromatic nuclei derived from naphthalene, anthracene, phenanthrene, and the like also are operable when dissolved in a suitable solvent during the oxidation. The aryl group may be substituted with alkyl groups such as methyl, ethyl, propyl, isopropyl, butyl, isobutyl, secondary butyl, tertiary butyl and the like, the same alkyl groups also being representative of $R_1$ and $R_2$ in the structural formula. $R_1$ and $R_2$ may be either the same or different.

The amount of hydroperoxide which may be used in accordance with this invention may be from about 0.02 to about 5.0% based on the monomers, a highly useful amount of hydroperoxide on this basis being from about 0.1 to about 1.5%. The preferable amount of hydroperoxide is from about 0.2 to about 1.0% based on the monomers.

As shown by the examples the polymerizations are carried out in the presence of an activator comprising a water-soluble heavy metal salt and an $\alpha$-hydroxycarbonyl compound such as a reducing sugar. The combination of the water-soluble heavy metal salt and an $\alpha$-hydroxycarbonyl compound constitutes what is known as a redox system, which is so called because of its property of catalyzing oxidation-reduction reactions. The usual redox system usually comprises a salt of a heavy metal such as iron, cobalt, nickel, copper, silver, zinc, cadmium, mercury, chromium, manganese, or molybdenum associated with a complex-forming compound such as a pyrophosphate, oxalate, citrate, tartrate or salicylate. The usual redox system therefore comprises essentially a heavy metal complex wherein the metal is united to another element through coordinate covalences rather than by primary valances.

The redox system of this invention, however, also includes an $\alpha$-hydroxycarbonyl compound or a compound behaving as an $\alpha$-hydroxycarbonyl compound. Illustrative of these compounds have been those shown by the examples; namely, fructose, acetylacetone, and ascorbic acid, but additional operable compounds include benzoin, glucose, lactose, acetoin, propionoin, butyroin, isobutyroin, pivaloin and the like. In general, those aldehydes and ketones containing a hydroxyl group on an adjacent carbon atom in an alkyl chain, and having thereby in common the structural group

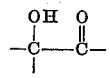

are operable in the process of this invention, but the preferable $\alpha$-hydroxy aldehydes and ketones are found in the class of polyhydroxy aldehydes and ketones known as reducing sugars.

Exemplary of the reducing sugars which may be used in accordance with this invention are the monosaccharides, including aldotrioses such as glycerose; ketotrioses such as dioxyacetone; aldotetroses such as erythrose and threose; ketotetroses such as erythrulose; aldopentoses such as arabinose, xylose, lyxose, and ribose; ketopentoses such as araboketose and xyloketose; aldohexoses such as glucose, galactose, mannose, gulose, idose, talose, allose and the like; ketohexoses such as fructose or levulose, sorbose and the like; and other reducing sugars including the disaccharides and trisaccharides such as maltose, lactose and mannotriose. Also operable is the equimolecular mixture of fructose and glucose obtained through the hydrolysis of sucrose and known as invert sugar.

In the redox system used in accordance with this invention the preferable water-soluble heavy metal salt is one derived from either ferric or ferrous iron. Based on the monomers the amount of heavy metal salt may be from about 0.0003 to about 1.0%, a highly useful range being from about 0.003 to about 0.35%, and the preferable range being from about 0.01 to about 0.1%. Likewise, the preferable reducing sugars are the keto sugars; particularly suitable is fructose. As illustrative of the $\alpha$-hydroxycarbonyl compounds in general, the amount of the reducing sugar based on the monomers may be from about 0.025 to about 4%, a preferable range on this basis being from about 0.2 to about 1%. Particularly applicable is an amount of sugar based on the monomer of 0.5%.

Compounds which may be advantageously polymerized in aqueous emulsion by means of the process of this invention include the conjugated butadienes such as butadiene-1,3, isoprene, 2,3-dimethyl butadiene-1,3, chloroprene, piperylene, monomer mixtures of two or more of these butadienes such as a mixture of butadiene-1,3 and 2,3-dimethyl butadiene-1,3 and monomer mixtures of one or more of these conjugated butadienes with vinyl compounds such as styrene, p-chlorostyrene, p-methoxystyrene, vinyl naphthalene, acrylic acid, acrylonitrile, methacrylonitrile, methyl acrylate, methylmethacrylate, methyl vinyl ketone, methyl isopropenyl ketone, and the like. The process of this invention has been found to be particularly applicable in the preparation of the copolymers of butadiene and styrene or acrylonitrile, isoprene and styrene or acrylonitrile, and other rubberlike copolymers as well as in the preparation of polymers such as polyvinyl chloride, polyvinyl acetate, polystyrene, polymethylmethacrylate, polyvinylidene chloride, polyvinyl pyridine, and the various other addition polymers which may be prepared by the emulsion technique. It is desirable, particularly in the polymerization of those compounds leading to synthetic rubberlike materials, that there be included in the polymerization reaction mixture a mercaptan modifier. The amount of modifier which may be utilized may be that conventionally used in such polymerizations. It is desirable, however, that the mercaptan modifier be a tertiary mercaptan since, although primary mercaptans, for example, give polymerization rates comparable to those obtained with a tertiary mercaptan, the latter give improved modification of the synthetic polymers.

The polymerizations may generally be carried out under the same reaction conditions known in the art for emulsion polymerization, for example, concentration of reactants, temperature, pressure and the like. The temperature of the reaction generally may be varied from about 15° to about 100° C., although the preferable range from the standpoint of reaction rate is from 40° to 60° C. In the case of the alkali metal salts of the saturated fatty acids, however, the polymerizations may be carried out as low as 0° C., since it is possible with these emulsifying agents to obtain easily high yields of polymers at lower temperatures, for example, 15° C., in lengths of time much lower than those previously necessary in other polymerization systems operating at the same temperature.

The process in accordance with this invention, using as emulsifying agents the alkali metal salts of fatty acids, permits the attainment of high yields in reaction times much less than those previously necessary. Actually, it is possible utilizing the process in accordance with this invention to obtain high yields of polymers in one-half or even less the reaction time involved in obtaining comparable yields of polymers using some of the polymerization systems previously known to the art. It is possible to obtain such high yields in such short reaction times not only with the saturated fatty acid soaps but also with the unsaturated fatty acid soaps. The process of this invention is advantageous in that it permits utilization as emulsifying agents materials which are economical. The combination of the particular catalysts; namely, those tertiary organic hydroperoxides having more than 5 carbon atoms with the activating redox system comprising a water-soluble heavy metal salt and an α-hydroxycarbonyl compound makes possible the short reaction times involved in the process of this invention. Through practice of this invention, increased yields are obtained by polymerizations carried out at lower temperatures for periods of time comparable to those which have been previously used in the art.

What I claim and desire to protect by Letters Patent is:

1. The process which comprises polymerizing in aqueous emulsion an organic compound containing the $CH_2=C<$ group in the presence of a catalyst comprising a tertiary organic hydroperoxide having between 7 and 15 carbon atoms, an activator comprising a water-soluble heavy metal salt and an α-hydroxycarbonyl compound, and an emulsifying agent comprising an alkali metal salt of a fatty acid.

2. The process which comprises polymerizing in aqueous emulsion an organic compound containing the $CH_2=C<$ group in the presence of a catalyst comprising a tertiary organic hydroperoxide having between 7 and 15 carbon atoms, an activator comprising a water-soluble heavy metal salt and a reducing sugar, and an emulsifying agent comprising an alkali metal salt of a fatty acid.

3. The process which comprises polymerizing in aqueous emulsion an organic compound containing the $CH_2=C<$ group in the presence of a catalyst comprising an α,α-dialkylarylmethyl hydroperoxide, having not more than 15 carbon atoms an activator comprising a water-soluble heavy metal salt and a reducing sugar, and an emulsifying agent comprising an alkali metal salt of a fatty acid.

4. The process which comprises polymerizing in aqueous emulsion an organic compound containing the $CH_2=C<$ group in the presence of a catalyst comprising α,α-dimethylbenzyl hydroperoxide, an activator comprising a water-soluble heavy metal salt and a reducing sugar, and an emulsifying agent comprising an alkali metal salt of a fatty acid.

5. The process which comprises polymerizing in aqueous emulsion an organic compound containing the $CH_2=C<$ group in the presence of a catalyst comprising a tertiary organic hydroperoxide having between 7 and 15 carbon atoms, an activator comprising a water-soluble heavy metal salt and a monosaccharide, and an emulsifying agent comprising an alkali metal salt of a fatty acid.

6. The process which comprises polymerizing in aqueous emulsion an organic compound containing the $CH_2=C<$ group in the presence of a catalyst comprising a tertiary organic hydroperoxide having between 7 and 15 carbon atoms, an activator comprising a water-soluble heavy metal salt and a ketose, and an emulsifying agent comprising an alkali metal salt of a fatty acid.

7. The process which comprises polymerizing in aqueous emulsion an organic compound containing the $CH_2=C<$ group in the presence of a catalyst comprising a tertiary organic hydroperoxide having between 7 and 15 carbon atoms, an activator comprising a water-soluble heavy metal salt and a ketohexose, and an emulsifying agent comprising an alkali metal salt of a fatty acid.

8. The process which comprises polymerizing in aqueous emulsion an organic compound containing the $CH_2=C<$ group in the presence of a catalyst comprising a tertiary organic hydroperoxide having between 7 and 15 carbon atoms, an activator comprising a water-soluble heavy metal salt and fructose, and an emulsifying agent comprising an alkali metal salt of a fatty acid.

9. The process which comprises polymerizing in aqueous emulsion an organic compound containing the $CH_2=C<$ group in the presence of a catalyst comprising a tertiary organic hydroperoxide having between 7 and 15 carbon atoms, an activator comprising a water-soluble iron salt and fructose, and an emulsifying agent comprising an alkali metal salt of a fatty acid.

10. The process which comprises polymerizing in aqueous emulsion an organic compound containing the $CH_2=C<$ group in the presence of a catalyst comprising a tertiary, alkyl-substituted naphthene hydroperoxide having between 7 and 15 carbon atoms, an activator comprising a water-soluble heavy metal salt and a reducing sugar, and an emulsifying agent comprising an alkali metal salt of a fatty acid.

11. The process which comprises polymerizing in aqueous emulsion an organic compound containing the $CH_2=C<$ group in the presence of a catalyst comprising a mixture of tertiary, alkyl-substituted cyclopentyl hydroperoxides having between 7 and 15 carbon atoms and tertiary alkyl-substituted cyclohexyl hydroperoxides having between 7 and 15 carbon atoms, an activator comprising a water-soluble heavy metal salt and a reducing sugar, and an emulsifying agent comprising an alkali metal salt of a fatty acid.

12. The process which comprises polymerizing in aqueous emulsion an organic compound containing the $CH_2=C<$ group in the presence of a catalyst comprising a mixture of dimethylcyclopentyl, methylcyclohexyl and dimethylcyclohexyl hydroperoxides, an activator comprising a water-soluble heavy metal salt and a reducing sugar, and an emulsifying agent comprising an alkali metal salt of a fatty acid.

13. The process which comprises polymerizing in aqueous emulsion an organic compound containing the $CH_2=C<$ group in the presence of a catalyst comprising a mixture of dimethylcyclopentyl, methylcyclohexyl and dimethylcyclohexyl hydroperoxides, an activator comprising a water-soluble heavy metal salt and an aldohexose, and an emulsifying agent comprising an alkali metal salt of a fatty acid.

14. The process which comprises polymerizing in aqueous emulsion an organic compound containing the $CH_2=C<$ group in the presence of a catalyst comprising a mixture of dimethylcyclopentyl, methylcyclohexyl and dimethylcyclohexyl hydroperoxides, an activator comprising a water-soluble heavy metal salt and glucose, and an emulsifying agent comprising an alkali metal salt of a fatty acid.

15. The process which comprises polymerizing in aqueous emulsion an organic compound containing the $CH_2=C<$ group in the presence of a catalyst comprising a mixture of dimethylcyclopentyl, methylcyclohexyl and dimethylcyclohexyl hydroperoxides, an activator comprising a mixture of water-soluble iron and cobalt salts and glucose, and an emulsifying agent comprising an alkali metal salt of a fatty acid.

16. The process which comprises polymerizing in aqueous emulsion butadiene-1,3 in the presence of a catalyst comprising a mixture of dimethylcyclopentyl, methylcyclohexyl and dimethylcyclohexyl hydroperoxides, an activator comprising a mixture of water-soluble iron and cobalt salts and glucose, and an emulsifying agent comprising an alkali metal salt of a fatty acid.

17. The process which comprises copolymerizing in aqueous emulsion at least two organic compounds containing the $CH_2=C<$ group in the presence of a catalyst comprising a tertiary organic hydroperoxide having between 7 and 15 carbon atoms, an activator comprising a water-soluble heavy metal salt and an α-hydroxycarbonyl compound, and an emulsifying agent comprising an alkali metal salt of a fatty acid.

18. The process which comprises copolymerizing in aqueous emulsion a mixture of butadiene-1,3 and styrene in the presence of a catalyst comprising α,α-dimethylbenzyl hydroperoxide, an activator comprising a water-soluble iron salt and fructose, and an emulsifying agent comprising an alkali metal salt of a fatty acid.

19. A process which comprises polymerizing an organic monomeric material comprising an unsaturated organic compound containing a $CH_2=C<$ group in aqueous emulsion in the presence of α,α-dimethylbenzyl hydroperoxides, an organic reducing agent selected from the group consisting of aldoses and ketoses, a water-soluble iron salt and an alkali metal salt of a fatty acid emulsifying agent until a polymer of said monomeric material is obtained.

20. A process for copolymerizing butadiene-1,3 and styrene in aqueous emulsion in the presence of α,α-dimethylbenzyl hydroperoxide, a water-soluble iron salt, a reducing sugar, a mercaptan modifier and an alkali metal salt of a fatty acid emulsifying agent, until a rubbery copolymer is obtained.

EDWIN J. VANDENBERG.

References Cited in the file of this patent

UNITED STATES PATENTS

| Number | Name | Date |
| --- | --- | --- |
| 2,367,805 | Semple | Jan. 23, 1945 |
| 2,380,476 | Stewart | July 31, 1945 |
| 2,395,523 | Vaughn et al. | Feb. 26, 1946 |
| 2,400,041 | Dickey | May 7, 1946 |
| 2,403,758 | Rust et al. | July 9, 1946 |
| 2,430,590 | Stewart | Nov. 11, 1947 |
| 2,450,451 | Schmerling | Oct. 5, 1948 |
| 2,476,936 | Whetstone | July 19, 1949 |